(No Model.)

C. G. LOTT.
BELT TIGHTENER.

No. 354,836. Patented Dec. 21, 1886.

Witnesses:
Frank J. Blanchard
Anton Schoeninger

Inventor:
Charles G. Lott
By Wm. H. Lotz
Attorney

UNITED STATES PATENT OFFICE.

CHARLES G. LOTT, OF CHICAGO, ILLINOIS, ASSIGNOR TO THE A. PLAMONDON MANUFACTURING COMPANY, OF SAME PLACE.

BELT-TIGHTENER.

SPECIFICATION forming part of Letters Patent No. 354,836, dated December 21, 1886.

Application filed March 4, 1886. Serial No. 193,947. (No model.)

*To all whom it may concern:*

Be it known that I, CHARLES G. LOTT, a citizen of the United States of America, residing at Chicago, in the county of Cook and State of Illinois, have invented certain new and useful Improvements in Belt-Tighteners, of which the following is a specification, reference being had therein to the accompanying drawings.

This invention relates to pulleys applied for tightening belts for the purpose of increasing their frictional adhesion to the hand-wheels over which they run, and the object I have in view is to provide a frame-work for such a pulley that is simple, strong, and durable in its construction, and so compact in its arrangement as to enable its being placed into very close locations, while at the same time it is adapted for readily and forcibly moving the pulley to impart the desired tension to the belt to which it is applied.

My invention, therefore, consists of the novel devices and combinations of devices, hereinafter described and specifically claimed.

Figure 1:
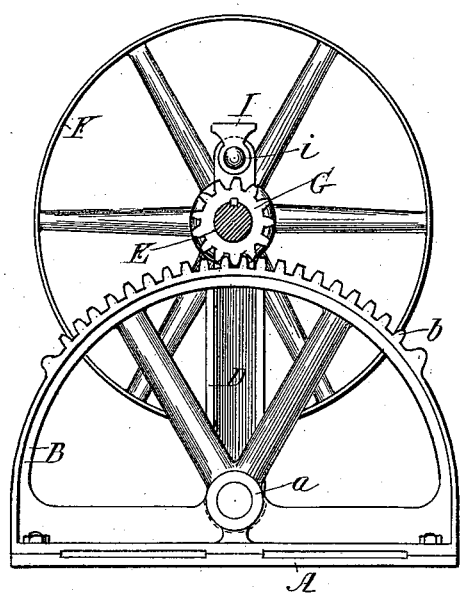
Figure 2:
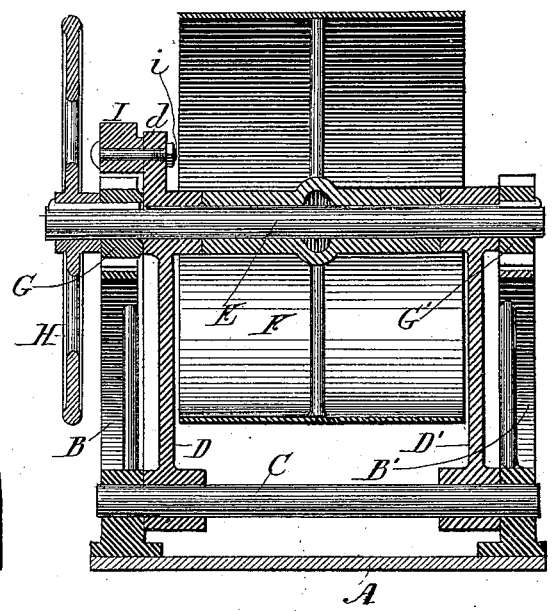

In the accompanying drawings, Figure 1 represents an elevation, and Fig. 2 a transverse vertical section, through the center of the tightener-pulley and frame.

Corresponding letters in the several figures of the drawings designate like parts.

A denotes the bed-plate, upon the ends of which are rigidly bolted two upright semicircular frames, B B', each having, concentric with its rim, a hub, $a$, and being provided around a portion of its periphery with spur-wheel teeth $b$. The ends of a shaft, C, are pivoted in the hubs $a$ of frames B B', and upon this shaft are rigidly mounted two arms, D D', so as to be on line with each other. Through eyes at the upper ends of arms D D' is passed a shaft, E, to turn therein, and the hub of the tightener-pulley F is sleeved between the arm-eyes upon such shaft to rotate thereon. Two pinions, G G', are rigidly mounted upon shaft E, exteriorly of the arm-eyes, which pinions mesh with the teeth of frames B B', and exteriorly again of pinion G is mounted upon the end of shaft E a hand-wheel, H. One of the arms, D, has an extension-plate, $d$, against which, on a bolt, $i$, is pivotally secured a reversible pawl, I, that engages with the teeth of pinion G on either direction for locking the arms at any desired angular position. This frame can be secured by bolts passed through its bedplate A, upon a floor, under a ceiling, or against a wall, or to any frame-work, to bring it in proper position relative to the belt to be tightened, when by turning the hand-wheel H, and thereby shaft E, the pinions can be rotated in either direction for advancing or retracting the pulley, and can then be locked on any position by engaging pawl I with the pinion-teeth.

What I claim is—

The combination, with a tightener-pulley and its shaft, of an independent shaft, arms connecting the two shafts, a hand-wheel and pinions mounted upon the pulley-shaft, and segmented racks with which such pinions engage, as set forth.

In testimony whereof I affix my signature in presence of two witnesses.

CHARLES G. LOTT.

Witnesses:
ANTON SCHOENINGER,
ERNST HAMBURGER.